United States Patent [19]

Leenhouts

[11] Patent Number: 4,758,752

[45] Date of Patent: Jul. 19, 1988

[54] HIGH-SPEED HYBRID STEP MOTOR

[76] Inventor: Albert C. Leenhouts, 61 Bull Rd., Harwinton, Conn. 06791

[21] Appl. No.: 24,839

[22] Filed: Mar. 12, 1987

[51] Int. Cl.⁴ .................. H02K 19/12; H02K 37/02
[52] U.S. Cl. .................................. 310/49 R; 310/254
[58] Field of Search ............... 310/49 R, 162, 254, 310/269, 186; 318/696

[56] References Cited

U.S. PATENT DOCUMENTS 3,519,859  7/1970  Morreale et al. ............... 310/49 R
4,190,779  2/1980  Schaeffer ....................... 310/49 R
4,687,961  8/1987  Horber ............................ 310/186

FOREIGN PATENT DOCUMENTS 2235086  2/1974  Fed. Rep. of Germany .... 310/49 R

Primary Examiner—Patrick R. Salce
Assistant Examiner—D. L. Rebsch
Attorney, Agent, or Firm—John H. Crozier

[57] ABSTRACT

A stepping motor which includes a rotor and a stator having a plurality of poleshoes extending inwardly in closely spaced relation to the rotor, each of the poleshoes being disposed in one of a plurality of groups of poleshoes. Each poleshoe in each of the groups is uniformly angularly spaced from each other adjacent poleshoe in the same group, and each group is angularly spaced from each adjacent group by an angle which is different from the angle between adjacent poleshoes in the same group.

12 Claims, 3 Drawing Sheets

HIGH-SPEED HYBRID STEP MOTOR

BACKGROUND OF THE INVENTION

The invention relates to hybrid, including so called enhanced hybrid, step motors and has particular application to such motors having a 1.8 or 0.9 degree step angle, although it will be understood by those skilled in the art to have application to other step motors.

Step motors have been widely adopted for a variety of control systems. Such motors, are particularly attractive because they lend themselves to an open loop control structure and because they are readily operated with a microprocessor control. The open loop control structure is particularly advantageous since it eliminates the need for transducers attached to the motor to measure position, velocity or acceleration. The generally recognized step motor types include the variable reluctance step motor, the canstack motor and the hybrid step motor. Such motors have been known for at least 20 years. More recent developments include the axial airgap step motor and enhanced hybrid step motors. The axial airgap step motor designs have included velocity sensing coils integral with the motor. These coils provide damping for the step motor by velocity feedback. Such velocity coils produce sinusoidal voltages. Motors damped by such coils can respond with no significant overshoot and thus reduce the motion time. In addition, the damping also eliminates the possibility of resonances which can result in loss of synchronism. An example of the present state of the art is a paper entitled, "Damping A Two-Phased Step Motor With Velocity Coils" by Jacob Tal, Luciano Antognini, Pierre Gandel, and Norbert Veignat presented in the 1985 Incremental Motion Control Systems Society publication.

So called enhanced hybrid step motors have been manufactured which have rare earth permanent magnets inserted between the stator teeth. This produces a marked reduction in magnetic leakage. This design produces an increase in pullout torque of 50 to 60 percent over similarly sized conventional hybrid step motors. The present invention has particular application to the hybrid step motor and the enhanced hybrid step motor.

The hybrid step motor has been widely used for the carriage drive and daisy wheel drive in printer mechanisms utilized in computer installations. Other applications for hybrid motors include those where the application requires that overshoot and ringout are minimized.

A limitation inherent in step motors is that with a typical number of rotor teeth, fifty rotor teeth for example, relatively moderate shaft speeds of even 1500 R.P.M. require that the motor be driven at an electrical frequency of over 1000 Hz. At these frequencies, the eddy current and hysteresis losses in the laminations become significant. At high speed, the losses in the magnetic material limit the performance of the motor.

When step motors having a large number of poles are used at output levels of over 2000 watts, the high inductance of such motors causes their power factor to become unacceptable; too much of the voltage capability of the drive circuit is spent on overcoming inductance, rather than the torque related E.M.F. A reduction in inductance by a factor of two, while maintaining all other parameters, would typically double the available high speed torque and the mechanical output power for a given Volt-Ampere rating of the driver circuit. Since in a typical step motor system, the driver electronics tends to be the most costly part, and a motor that offers better utilization of the available voltage and current is of substantial value. The price paid for simplicity of an open loop system may become too high.

A second problem in the known hybrid step motors is that high speed performance is limited by the losses in the magnetic materials of the rotor and stator. A reduction in these losses permits the effective use of the improved performance, due to lower inductance.

All step motors are vulnerable to a loss of synchronism. More particularly, the motor may over overshoot a stable position and then "lose" or "skip" one or more steps. Any loss of steps must be the equivalent of one or more full rotor tooth pitches or one or more electrical cycles. Such occurrences are unacceptable in an open loop control system.

It is an object of the invention to provide an improved hybrid step motor which has improved high speed torque and mechanical output power.

It is another object of the invention to provide an improved hybrid step motor which will not require any increase in the cost of driver electronics and which will have a higher output power even when driven with existing drive electronics.

It is another object of the present invention to produce a hybrid step motor which has lower inductance and thus less loss in the magnetic materials of the rotor and stator.

Still another object of the invention is to provide an apparatus which will have a physical construction which lends itself to the incorporation of velocity coils for detecting the E.M.F. of the motor to provide damping and, more generally, closed loop control.

It is still another object of the invention to provide a hybrid step motor construction which incorporates such velocity coils in a structure which is magnetically balanced and which produces a torque which is close to the torque which is produced in the same motor without the velocity coils.

Yet another object of the invention is to provide apparatus which is less vulnerable to loss of synchronism.

SUMMARY OF THE INVENTION

It has now been found that these and other objects of the invention may be attained in a stepping motor which includes a rotor and a stator having a plurality of poleshoes extending inwardly in closely spaced relation to the rotor, each of the poleshoes is disposed in one of a plurality of groups of poleshoes. Each poleshoe in each of the groups is uniformly angularly spaced from each other poleshoe in the same group, each group being angularly spaced from each adjacent group by an angle which is different from the angle between adjacent poleshoes in the same group.

In many forms of the invention each group will have four poleshoes and each poleshoe may have two teeth thereon. Such motors may have a step angle of .9 times K degrees and the number of groups may be equal to ten divided by K where K is a constant. The angle between corresponding points on successive groups is 36 times K degrees and the the angle between adjacent poleshoes in the same group is 8.1 times K degrees ordinarily. Tooth width and tooth spacing on a poleshoe are used to control the presence of torque harmonics.

Usually each poleshoe is substantially identical to each other poleshoe.

BRIEF DESCRIPTION OF THE DRAWING

The invention will be better understood by reference to the accompanying drawing in which.

DESCRIPTION OF THE PREFERRED EMBODIMENT

Figure 1:
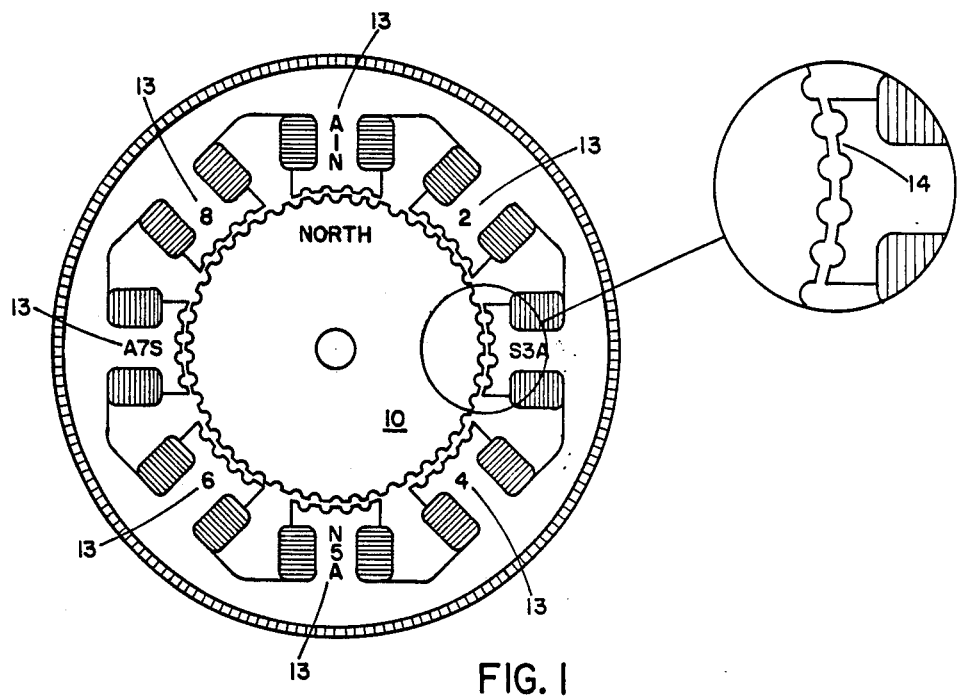
FIGS. 1 and 2 are respectively schematic cross sectional views taken through a north magnetized rotor cup and a south magnetized rotor cup of a prior art motor.
Figure 2:
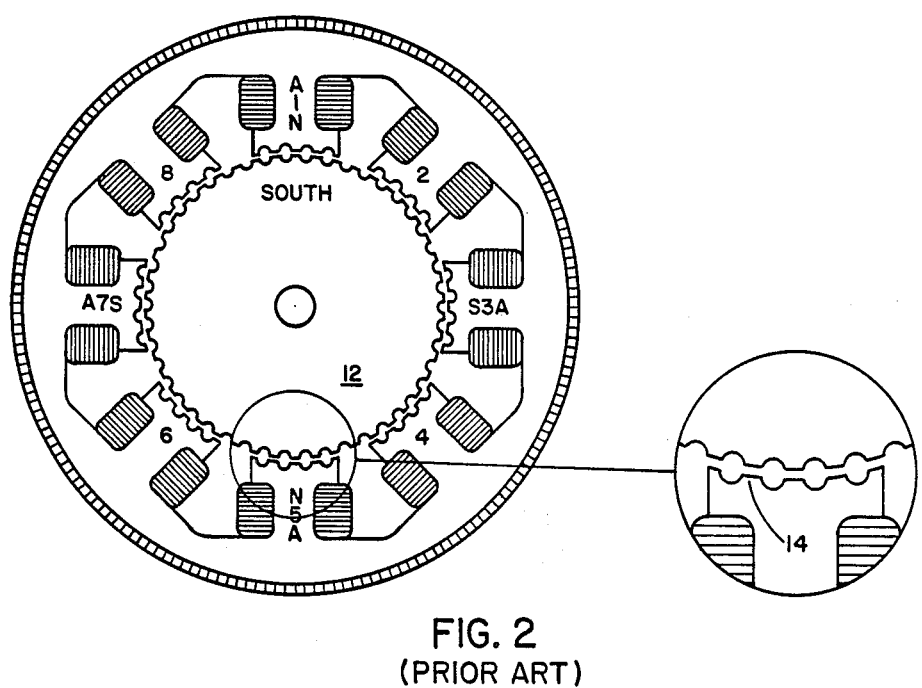

Referring now to FIGS. 1 and 2 there is shown a prior art step motor of conventional construction. The motor includes two rotor cups 10, 12 of soft iron construction that conduct the flux of a permanent magnet to the airgap between rotor and stator. The rotor cups 10, 12 have teeth on the surface to guide this magnet flux to preferred locations in the airgap. In longer motors (not shown) there may be up to four sets of one magnet and two rotor cups. In each set the associated rotor cups are normally offset by ½ toothpitch. In the usual prior art motor design, eight poleshoes 13 are each provided with five teeth 14 as best seen in the enlarged inset of FIGS. 1 and 2. The poleshoes 12 are uniformly spaced and the teeth 14 on each poleshoe 13 are also uniformly spaced. The first, third, fifth and seventh poleshoes 12 are part of phase A and the second, fourth, sixth and eighth poleshoes 13 are part of phase B. Sequential energization of phase A with positive current, energization of phase B with positive current, energization of phase A with negative current and energization of phase B with negative current causes stepping rotary movement of the rotor. In some such motors, half steps are obtained by simultaneous energization of both phase A and phase B.

Figure 3:
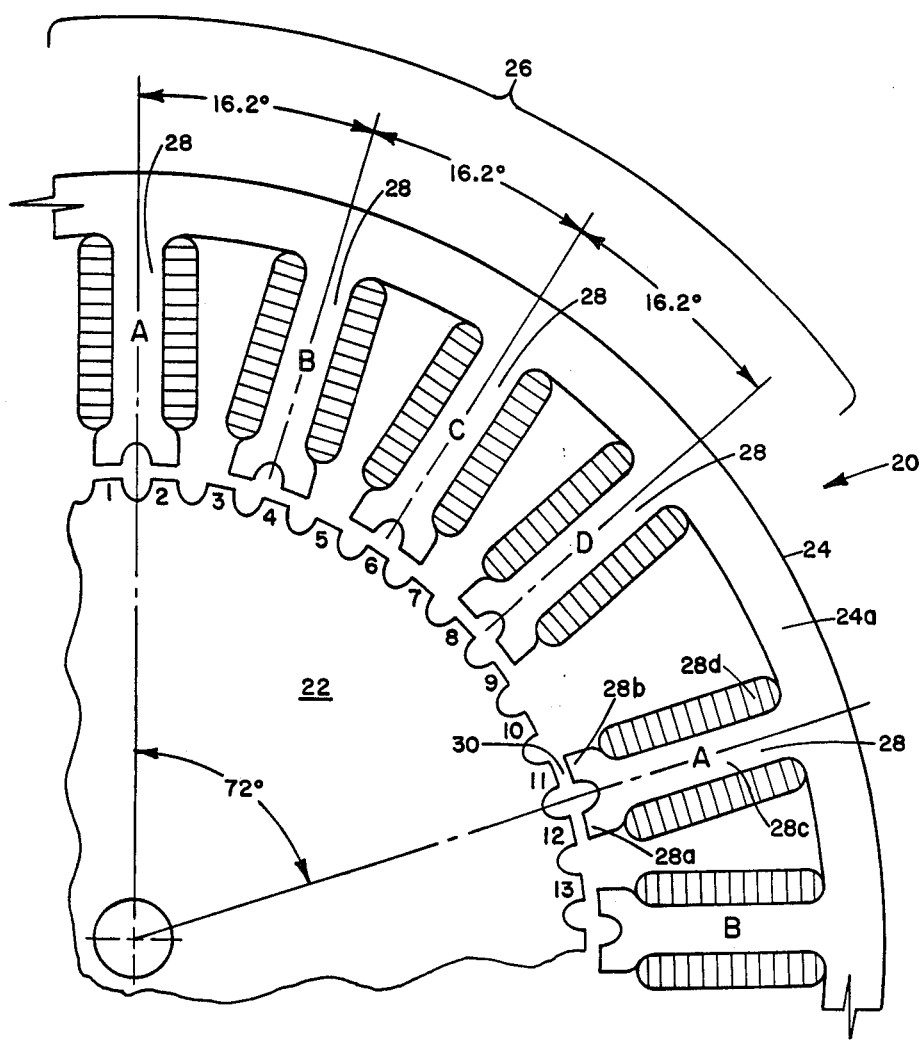
FIG. 3 is a fragmentary schematic cross-sectional view of a quadrant of the motor in accordance with the invention.
Figure 4:
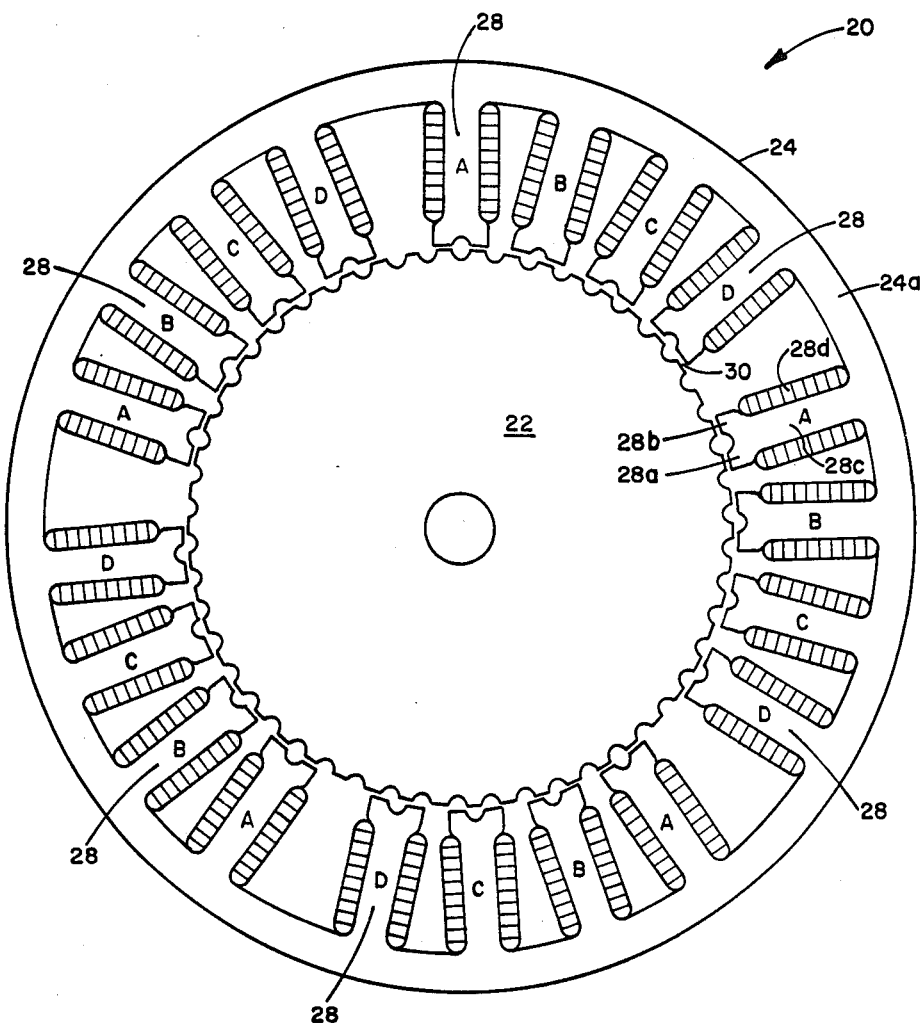
FIG. 4 is a schematic cross-sectional view of the motor shown in FIG. 3.

Referring now to FIGS. 3 and 4 there is shown a preferred embodiment of a 1.8 degree stepper motor in accordance with the present invention. This motor 20 is provided with a rotor 22 and a stator 24. The rotor 22 is conventional and has fifty uniformly spaced axially extending teeth. In the conventional manner, the motor 20 will have a plurality of rotor cups which will have the teeth in axially adjacent rotor cups offset by one half of a tooth pitch.

The stator 24 has twenty inwardly extending poleshoes. These twenty poleshoes 24 are arranged in five groups 26 of four poleshoes 20. One group 26 is shown in greater detail in Figure 3. The poleshoes 28 within a group 26 are evenly spaced and the groups are evenly spaced about the periphery of the rotor 22. In the preferred embodiment, the poleshoes within each group 26 are angularly spaced from each adjacent poleshoe within the same group by an angle of 16.2 degrees. The angle between the corresponding points in circumferentially adjacent groups is 72 degrees. Thus, the spacing between poleshoes 28 within a group 26 is not the same as the spacing between poleshoes 26 which are in different groups and which are adjacent. More particularly, the angle between the center lines of the poleshoes 28 which are adjacent but not in the same group, in the preferred embodiment, is 23.4 degrees or 30 times K degrees.

The poleshoes 28 in each group are sequentially designated A, B, C and D so that the poleshoe D of one group 26 is adjacent to the poleshoe A in the circumferentially adjacent group 26. The poleshoes 28 designated as A and C in each group 26 constitute one phase of the motor 20 and the poleshoes 28 designated B and D in each group constitute the second phase. Each poleshoe 28 is divided into two teeth or pole pieces 28a and 28b at the airgap 30. Since each leg 28c of each poleshoe 28, in the apparatus in accordance with the invention, needs to only carry the flux for two teeth 28a and 28b, rather than five as in the prior art, the legs 28c of each poleshoe 28 may be much thinner. The inductance of the motor is reduced because the amount of ampere turns of the winding 28d on each leg is reduced by 60 percent. The inductance of the winding 28d on each leg 28c is thus reduced 60 percent from the equivalent eight poleshoe motor.

In addition, the width of the back-iron 24a, the circular outer ring that supports the poleshoes 28, can be reduced. This allows an increase in the rotor diameter of the motor for a given amount of winding volume. For a given flux density the torque of the motor 20 is proportional to the square of the rotor 24 diameter, so that even a small increase in rotor 24 diameter is useful.

If so desired, every fifth poleshoe can be used for the sensing of the E.M.F. generated by the rotation of the motor. In that case the overall magnetic symmetry of the motor 20 is maintained. In this case twenty percent of the winding volume is used for E.M.F. sensing. The permitted stator dissipation is then divided over the remaining phase windings, resulting in a reduction of the rated torque of the motor by about ten percent.

Alternatively, four polepieces 28 in a single group 26 may be used for E.M.F. sensing.

Those skilled in the art will understand that the embodiment of the invention having a 0.9 degree step angle will have have 100 teeth on the rotor and the stator will have forth poleshoes arranged in ten groups of four each. Each poleshoe will have two teeth as in the 1.8 degree step angle motor. The 0.9 step angle motor will have a stator construction which can be visualized as two 1.8 degree step angle motors which have been developed or arranged in two linear arrays which are in side by side (end abutting) relationship. Still other variations will be apparent to those skilled in the art.

Having thus described the invention I claim:

1. A two-phase stepping motor, comprising:
   (a) a rotor having a plurality of uniformly spaced teeth; and
   (b) a stator having a plurality of poleshoes extending inwardly in closely spaced relation to said rotor, each of said poleshoes being disposed in one of a plurality of groups of poleshoes, each poleshoe in each of said groups being uniformly angularly spaced from each other adjacent poleshoe in the same group by an angle which is other than an integer multiple of the spacing between said rotor teeth, each group being angularly spaced from each adjacent group by an angle which is different from the angle between adjacent poleshoes in the same group.

2. A two-phase stepping motor, as defined in claim 1, wherein each of said groups has four poleshoes.

3. A two-phase stepping motor, as defined in claim 1, wherein each poleshoe has two teeth thereon.

4. A two-phase stepping motor, as defined in claim 1, wherein the motor has a step angle of 0.9 times K degrees, where K is a constant, and wherein the number of groups is equal to ten divided by K.

5. A two-phase stepping motor, as defined in claim 4, wherein the angle between corresponding points on successive groups is 36 times K degrees.

6. A two-phase stepping motor, as defined in claim 1, wherein the angle between adjacent poleshoes in the same group is 8.1 times K degrees.

7. A two-phase stepping motor, as defined in claim 4, wherein each poleshoe is substantially identical to each other poleshoe.

8. A two-phase stepping motor, as defined in claim 4, wherein K is an integer.

9. A two-phase stepping motor, as defined in claim 8, wherein K is one.

10. A two-phase stepping motor, as defined in claim 8, wherein K is two.

11. A stepping motor as described in claim 1, wherein one of said poleshoes in each of said groups is used for the sensing of the E.M.F. generated by the rotation of said rotor.

12. A stepping motor as described in claim 1, wherein all of said poleshoes in one of said groups are used for the sensing of the E.M.F. generated by the rotation of said rotor.

* * * * *

UNITED STATES PATENT AND TRADEMARK OFFICE
CERTIFICATE OF CORRECTION

PATENT NO. : 4,758,752

DATED : July 19, 1988

INVENTOR(S) : Albert C. Leenhouts

It is certified that error appears in the above-identified patent and that said Letters Patent is hereby corrected as shown below:

On the title page and Column 1, title of invention should read

-- HYBRID STEP MOTOR --.

Signed and Sealed this

Thirty-first Day of January, 1989

Attest:

DONALD J. QUIGG

*Attesting Officer*         *Commissioner of Patents and Trademarks*